United States Patent [19]

Haubennestel et al.

[11] Patent Number: 4,857,111

[45] Date of Patent: Aug. 15, 1989

[54] THIXOTROPIC FORMULATIONS, USE OF POLYCARBOXYLIC ACID AMIDES TO PRODUCE THEM, AND SILICA COATED WITH POLYCARBOXYLIC ACID AMIDES

[75] Inventors: Karl-Heinz Haubennestel, Wesel; Holger Heilmann, Hamminkeln; Andreas Diez, Wesel, all of Fed. Rep. of Germany

[73] Assignee: BYK-Chemie GmbH, Wesel, Fed. Rep. of Germany

[21] Appl. No.: 162,901

[22] Filed: Mar. 2, 1988

[30] Foreign Application Priority Data

Mar. 4, 1987 [DE]  Fed. Rep. of Germany ....... 3706860

[51] Int. Cl.⁴ .................... C09C 1/28; C08J 3/00
[52] U.S. Cl. ................ 106/504; 106/482; 106/499; 523/216; 523/508
[58] Field of Search ............ 106/308 N, 482, 499, 106/504; 523/216, 508

[56] References Cited

U.S. PATENT DOCUMENTS 4,167,421  9/1979  Linden et al. ............. 106/308 N
4,238,387 12/1980  Antonelli et al. ............. 524/560

Primary Examiner—Paul Lieberman
Assistant Examiner—Christine A. Skane
Attorney, Agent, or Firm—Foley & Lardner, Schwartz, Jeffery, Schwaab, Mack, Blumenthal & Evans

[57] ABSTRACT

Hydroxyfunctional carboxamide compounds of formula I

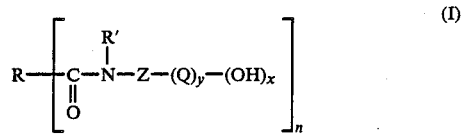

are included in thixotropic formulations containing highly disperse silica as a thickening or thixotroping component in order to activate the silica or enhance its effect, to amerliorate any tendency of the silica to settle and/or to prevent weakening of the thixotroping effect of $SiO_2$ in formulations which themselves form relatively strong hydrogen bonds. The compounds of formula I may be added to silica-containing thixotropic liquid formulations to improve the thixotropy, or highly disperse silica may be coated with such compounds for later incorporation into liquid systems to render them thixotropic.

32 Claims, No Drawings

THIXOTROPIC FORMULATIONS, USE OF POLYCARBOXYLIC ACID AMIDES TO PRODUCE THEM, AND SILICA COATED WITH POLYCARBOXYLIC ACID AMIDES

BACKGROUND OF THE INVENTION

The present invention relates to thixotropic formulations containing highly disperse silica, to hydroxyfunctional polycarboxylic acid amides of the type described in more detail below, which are used for producing such thixotropic formulations, and to highly disperse silica which has been coated with such hydroxy-functional polycarboxylic acid amides.

A wide variety of thixotropic formulations containing highly disperse silica is known. For generating thixotropy, highly disperse silica is used which is produced by wet or pyrogenic processes (preparation, for example: E. Wagner and H. Brunner, Angew. Chem. 72, 744 (1960)) and normally has a specific surface area (BET method DIN 66131) of about 50 to 400 m²/g. Such highly disperse silicas are frequently described in the specialized technical literature also as hydrophilic or colloidal amorphous silicic acids. (See also U.S. Pat. No. 4,238,387)

These silicas are added as a thickening or thixotroping component to liquid systems in diverse fields of application. The typical properties of such silica determine the effectiveness as a thickener and thixotroping agent.

When such silica is dispersed in formulations such as liquids or resin solutions, the chain formations are bonded to each other via hydrogen bonds and form a three-dimensional network. As a result, this process reduces the flowability of the liquid or resin solution. If this network is destroyed by the action of shear forces, the viscosity decreases and builds up again during a certain regeneration time. This process is generally termed thixotropy. Thus, thixotropy is a time-dependent, reversible and repeatable change in consistency, which occurs at the beginning and end of the action of shear forces (J. Schiefer, defazet, Volume 31, No. 2, pp. 62–65 (1977)).

This thixotropy effect is utilized, for example, to prevent settling or running of resin solutions, sealing compounds, adhesives, plastisols, paints, filler compounds and casting resins, and also for imparting a more viscous consistency to, for example, mineral oils. In some formulations, the silica tends to settle. Settling is here to be understood as a non-uniform distribution of the $SiO_2$ in a vertical plane of the system. This is particularly critical if such silica-containing dispersions are transported for a prolonged period in containers, that is to say are subjected to mechanical stresses. Attempts have been made to counteract this behavior by increasing the $SiO_2$ concentration in order to thereby reach a point where sufficient $SiO_2$ chains are present to be linked via hydrogen bonds and thus to build up more shearstable systems. In certain solutions such as, for example, vinyl ester resins in styrene, a thixotropy-providing effect can hardly be obtained by means of hydrophilic $SiO_2$.

An increase in the $SiO_2$ concentration up to the stable state is, however, not appropriate in all cases, since excessive $SiO_2$ concentrations cause faults in many industrial applications, which manifest themselves, for example, in undesired dulling effects in glossy coating formulations or in a decrease of strength in unsaturated polyester resin systems (SPI 21st Meeting: Corrosion resistance polyester resins by P. Trend, D. Edwards and P. V. Bramer).

In formulations which themselves form relatively strong hydrogen bonds, the thixotropy-providing effect of $SiO_2$ may be substantially weakened. Many manufacturers of highly disperse $SiO_2$ identify auxiliary agents in their product literature which can increase the thixotropy effect of $SiO_2$ in various polar systems. Thus, numerous products are described which are said to have a positive effect on the viscosity, thixotropy and the settling behavior of $SiO_2$ in formulations. These products comprise, for example, low-molecular weight glycols, low-molecular weight diamines, polyamines, carboxylic acids, sulfonic acids, ethylene oxide adducts, sorbitan esters, alkoxylated sorbitan esters, polyethylene glycols and water. (Company brochures: Degussa, Aerosil als Verdickungsmittel fuer Fluessigkeiten [Aerosil as a Thickener for Liquids], and Cabot, "Cabosil" p. 18).

Rotational viscometers are normally used for characterizing the flow behavior. In this case, the shear stress ($\tau$) is determined for various shear rates (D). As is known to those skilled in the art, the hysteresis area ($L = \tau \cdot D$) between the curve at rising shear rate and the curve at falling shear rate is used as a measure of the thixotropy (company brochure: Haake, Einfuhrung in die praktische Viskosimetrie [Introduction to Practical Viscometry], pages 17–19). These proposed products increase the viscosity of the liquid system without substantially affecting the thixotropy within the meaning of the definition given above, namely the formation of a pronounced hysteresis area (L).

In the case of the low-molecular weight compounds, the positive effects are often only of short duration, since the hydrogen bonds between $SiO_2$ particles can be broken by rearrangement effects with solvents or low-molecular weight resin constituents. In the case of the amine-containing components, especially in unsaturated polyester resins, vinyl ester resins and epoxy resins, reactions with the resin can occur, so that these compounds are not particularly advantageous for such resin systems. In nitrocellulose coatings and PVC plastisols, amine-containing compounds cause discolorations.

U.S. Pat. No. 4,238,387 discloses that a pseudoplastic rheology of coating compositions can be obtained when these contain finely disperse silica, a polyfunctional acid and an amine in combination. The use of an acid alone or of an amine alone, in addition to the silica, does not produce any effect. It is thus essential that the coating composition contains both the polyfunctional acids or acid anhydrides with carboxyl groups or anhydride groups on the one hand and the amines with their amine groups on the other hand. The amines used can be those with or without hydroxyl groups. Primary, secondary or tertiary amines can be used. The acids used can be certain organic or inorganic acids or anhydrides thereof. At column 2, lines 66 to 69, it is mentioned incidentally that the acid or its anhydride can be reacted with the amine and then added to the $SiO_2$ dispersion. According to all the teaching in U.S. Pat. No. 4,238,387 this can only be understood as a salt formation. In contrast thereto, it has now been found that the specific hydroxyfunctional polyamides of formula I activate or enhance the effect of silica in various formulations, and particularly even in those formulations in which the mixtures of the aforementioned literature reference are largely ineffective, such as formulations containing vinyl esters as binders.

Among all the auxiliaries described in the literature, none is known which has a wide field of application and, together with SiO$_2$, produces adequate thixotropy in formulations of different polarity, that is to say which shows wide applicability and produces thixotropy within the meaning of the definition given above, namely the formation of a pronounced hysteresis area (L).

SUMMARY OF THE INVENTION

It is therefore the object of the invention to provide agents which make it possible to activate the silica used in different formulations or to enhance its effect. Surprisingly, in addition to a marked increase in the viscosity and yield value, this object is largely achieved with compounds of the type described below.

The invention relates to thixotropic formulations containing highly disperse silica, which comprise hydroxyfunctional polycarboxylic acid amides corresponding to the following formula I:

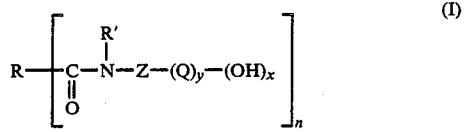

wherein the symbols have the following meanings:

R = aliphatic hydrocarbon groups having 2 to 60 carbon atoms or aromatic hydrocarbon groups having 6 to 20 carbon atoms or aliphatic or aliphatic/aromatic hydrocarbon radicals having 6 to 150 carbon atoms, which are interrupted by 2, 4, 6 or 8 carboxamide groups, or aliphatic hydrocarbon radicals having 4 to 150 carbon atoms, which are interrupted by 2 to 75 —O— (oxygen) groups;

R' = H or C$_1$ to C$_4$ alkyl or —Z'—(Q)$_y$—(OH)$_x$;

x = 1 to 3;

y = 0 or 1;

Z = an alkylene radical having 2 to 6 carbon atoms;

Z' = an alkylene radical, which is identical to or different from Z, having 2 to 6 carbon atoms;

Q = an aliphatic hydrocarbon radical having 2 to 200 carbon atoms which is linked to Z or Z' via —O— or

and is interrupted by zero to 99 oxygen atoms and/or carboxylic acid ester groups, and n = 2 to 3.

DETAILED DESCRIPTION OF PREFERRED EMBODIMENTS

The thixotropic formulations contain the compounds of the formula I in a quantity which effects an activation or enhancement of the highly disperse silica contained in the formulations. The appropriate quantity can be determined by reasonable mental effort, which also includes carrying out routine experiments. The effective concentration in each case, and especially the optimum concentration in each case, differ from formulation to formulation depending on, for example, the polarity, the nature of the resins and solvents present, and the like.

The expression "aliphatic" used in conjunction with the symbol R also comprises, according to the invention, cycloaliphatic groups.

The products used according to the invention are prepared by reacting polycarboxylic acids or derivatives thereof with alkanolamines and, in appropriate cases, with diamines in such a way that polycarboxylic acid alkanolamides or polyamidocarboxylic acid alkanolamides are formed.

Suitable polycarboxylic acids which can be used include those compounds which contain at least 2 carboxyl groups on a common aliphatic or aromatic hydrocarbon radical which may be interrupted by carboxamide groups or —O— groups (oxygen). Correspondingly, the derivatives of these carboxylic acids can also be used which are suitable for forming carboxamides with primary or secondary amines. Examples of such derivatives are carboxylic acid esters, carboxylic acid halides or carboxylic acid anhydrides.

Within the scope of the invention, the polycarboxylic acids or their derivatives used can be, for example, succinic acid, succinic anhydride, alkenylsuccinic anhydride such as, for example, 2-dodecen-1-ylsuccinic anhydride, glutaric acid, adipic acid, pimelic acid, suberic acid, azelaic acid, sebacic acid, decanedicarboxylic acid, dimerized fatty acids, trimerized fatty acids, 1,4-cyclohexanedicarboxylic acid, 1,2-cyclohexanedicarboxylic acid, 1,2-cyclohexanedicarboxylic acid anhydride, tetrahydrophthalic acid, phthalic acid, phthalic anhydride, isophthalic acid, terephthalic acid, trimellitic acid, 3,6,9-trioxaundecanedioic acid, polyglycoldioic acid (α-carboxymethyl-ω-carboxymethoxypolyoxyethylene) or mixtures of these acids.

Dimerized fatty acids (dimer fatty acids) are prepared by known processes, for example see German Offenlegungsschrift DE-OS 1,443,938; German Offenlegungsschrift DE-OS 1,443,968; German Patent DE-PS 2,118,702 and German Patent DE-PS 1,280,852. These dimerized fatty acids are polymerized unsaturated natural or synthetic aliphatic acids having 12 to 22 carbon atoms, preferably 18 carbon atoms (tall oil). The technical products contain, in addition to the dimerized acids, small quantities (e.g. about 0.1 to 3%) of the monomeric acids employed and trimeric acids. The trimeric acids can also be present in greater amounts, since these likewise yield highly effective products, compare Production Example 9 and Application Example A3. It is therefore possible to employ technical products which contain up to about 30% trimeric acids. The dimerized fatty acids can also be hydrogenated. Aliphatic dicarboxylic acids and polyglycoldioic acids are preferred. Dimerized fatty acids are particularly preferred.

Consequently, the symbol R preferably represents an aliphatic hydrocarbon group having at least 6 carbon atoms. The upper limit is advantageously at 44 carbon atoms. With particular preference, this group contains 34 to 42 carbon atoms. Those compounds in which R represents the radical of dimer fatty acids are an especially preferred group.

In another preferred embodiment, R is an aliphatic hydrocarbon radical having 6 to 26 carbon atoms, which is interrupted by 3 to 13 oxygen atoms.

The diamines used for extending the chain of the polycarboxylic acids to give polycarboxylic acid polyamides can be aliphatic and cycloaliphatic diamines such as, for example, ethylene diamine, 1,2-propylenediamine, 1,3-diaminopropane, 1,4-butanediamine, neopentanediamine, 4,4-diaminodicyclohexylmethane, 3-aminomethyl-3,5,5-trimethylcyclohexylamine (isophoronediamine), hexamethylenediamine, 1,12-dodecanediamine or mixtures of such suitable diamines. Aliphatic diamines having 2 to 6 carbon atoms are preferred because they are readily accessible and available commercially.

There are various possibilities for obtaining radicals R which contain 2, 4, 6 or 8 carboxamide groups. For example, the carboxylic acids can be reacted with diamines. If one mole of diamine is reacted with two moles of dicarboxylic acid, a radical R is obtained which has two carboxamide groups, that is to say in which the abovementioned hydrocarbon groups are interrupted by two carboxamide groups. It is also possible, however, to link several molecules of dicarboxylic acid and diamine with one another with chain extension, so that the radical represented by the symbol R contains more than 2 carboxamide groups, that is to say the particular hydrocarbon group is interrupted by more than 2 carboxamide groups. The starting components must of course be selected such that undesired excessive crosslinking reactions are avoided.

According to a preferred embodiment, the symbol R is an aliphatic hydrocarbon radical having 70 to 90 carbon atoms, which is interrupted by two carboxamide groups. Such groups preferably are the radical of two molecules of dimer fatty acid, linked to one another by diamine.

If the chain of the polycarboxylic acids is to be extended by reaction with diamines with amide formation, this reaction is preferably carried out initially in such a way that, on the basis of the molar quantity ratios of polycarboxylic acids and diamine used, on average at least two carboxyl groups in a resulting diamide remain unconverted and are available for reaction with alkanolamines. The polycarboxylic acid polyamides prepared in this way can, according to the invention, be used in the same way as polycarboxylic acids. However, the reaction can also be carried out in one step, using the appropriate molar quantities of diamine and alkanolamine, relative to the polycarboxylic acid.

For example, alkanolamines such as ethanolamine, diisopropanolamine, aminoethylpropanediol, diethanolamine, 2-amino-1-propanol, 3-amino-2,2-dimethyl-1-propanol, 2cyclohexylaminoethanol, 2-methylaminoethanol, 2-(2-aminoethoxy)ethanol, 2-amino-1-butanol, 2-amino-2-methyl-1-propanol, 2-amino-2-ethyl-1,3-propanediol and tris(hydroxymethyl)aminomethane are used for the reaction of the polycarboxylic acids or polycarboxylic acid polyamides to give alkanolamides. Z preferably is an alkylene radical having 2 or 3 carbon atoms. Alkanolamines having two hydroxyl groups are preferred. A particularly preferred group of compounds of formula I is that in which the symbol R' represents $-Z-(Q)_y-(OH)_x$. Thus, two identical radicals are then bound to the nitrogen atom in the square brackets of formula I. Such compounds are particularly easy to prepare, because the corresponding alkanolamines are commercially available.

The resulting polycarboxylic acid alkanolamides or polyamidopolycarboxylic acid alkanolamides can be reacted with corresponding components, which are reactive with hydroxyl functions, such as oxiranes or cyclic esters (lactones) with ring opening and consequent formation of new hydroxyl functions and can thus be adapted, in appropriate cases, to the needs of the situation, for example to polar systems such as water-containing systems, by addition of one or more ethylene oxide units to the hydroxyl groups. Examples of such oxiranes are ethylene oxide, propylene oxide, their mixtures and 2,3-epoxy-1-propanol. Examples of such lactones are $\beta$-propiolactone, $\delta$-valerolactone, $\epsilon$-caprolactone or substituted derivatives thereof. Examples of such lactones and the processes for esterifying them with ring opening can be found in U.S. Pat. No. 4,360,643. The resulting compounds are those of formula I in which y in $(Q)_y$ is 1. Preferably, Q is an aliphatic hydrocarbon radical having 2 to 80 carbon atoms, which is linked via —O— or

to Z or Z' and is interrupted by zero to 39 oxygen atoms and/or carboxylic acid ester groups.

The compounds containing carboxyl groups and the alkanolamines are reacted with one another in a molar ratio of carboxyl groups to amino groups of from 1:0.5 to 1:10, preferably from 1:0.5 to 1:3 and particularly preferably from 1:0.9 to 1:1.3. The known processes for the amidation of carboxyl groups or derivatives thereof are used for the reaction.

As is known to those skilled in the art, in the reaction of alkanolamines with carboxylic acids or derivatives thereof, certain proportions of the esters can be formed in addition to the amides which are to be formed preferentially. The requirement of alkanolamide formation can, however, be regarded as met if at least 50% of the desired carboxamide bonds have been formed and the remainder is in the form of a carboxylic acid ester or byproduct. According to the state of the art, all the reactions can be carried out either in bulk or in the presence of suitable solvents which do not interfere with the reaction. Aromatic hydrocarbons are particularly suitable, since they readily form azeotropes with water, and the resulting water of reaction can thus be easily removed from the reaction vessel. Moreover, the reactions can be carried out in the presence of conventional catalysts such as p-toluenesulfonic acid, sulfuric acid, trifluoromethanesulfonic acid and titanic acid esters.

As a rule, these reaction products are not added in the pure form to the thixotropic formulations, but as technical products such as are obtained in the reaction of polycarboxylic acids or polyamidocarboxylic acids with alkanolamines.

The formation of the polycarboxylic acid alkanolamides takes place, for example, in accordance with the following reaction sequence:

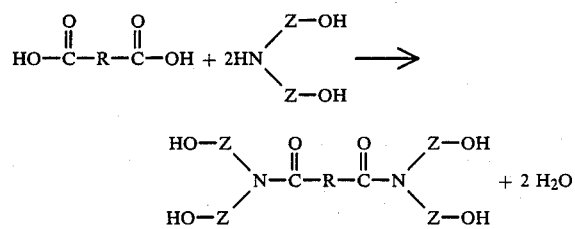

As is known to those skilled in the art, the reaction of the polycarboxylic acids or derivatives thereof with diamines in suitable ratio takes place under the same reaction conditions as were described above for the amide formation from polycarboxylic acids and alkanolamines. For example, the reaction proceeds as follows:

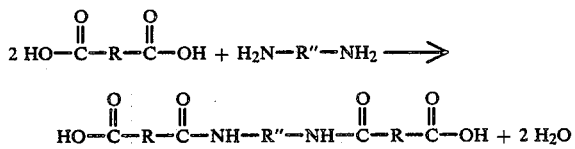

The resulting polycarboxylic acid alkanolamides or polyamidopolycarboxylic acid alkanolamides can be reacted by known processes with ethylene oxide or propylene oxide under pressure, optionally with the use of the conventional catalysts such as, for example, alkali metal hydroxide, alkali metal alkoxide or boron trifluoride etherate, for example at temperatures from 130° C. to 200° C., to give the corresponding alkoxylates. These processes are described in : Nikolaus Schoenfeld, Grenzflaechenaktive Aethylenoxidaddukte, [Surface-active Ethylene Oxide Adducts ], Wissenschaftliche Verlagsgesellschaft mbH, Stuttgart (1976). Further literature is referenced therein. The reaction proceeds, for example, in accordance with the following reaction scheme:

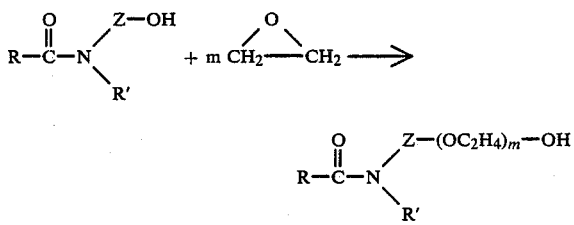

Glycidol (2,3-epoxy-1-propanol) can be reacted with the polycarboxylic acid alkanolamides or polyamidopolycarboxyliuc acid alkanolamides according to the invention to give the corresponding glycerol ethers or polyglycerol ethers by following conventional procedures for the reaction involving ring opening with alcohols. These processes are described, for example, by: J. Biggs, N. B. Chapman and V. Wray in J. Chem. Soc. (B) 1971,66. By way of example, the conversion obeys the following reaction sequence:

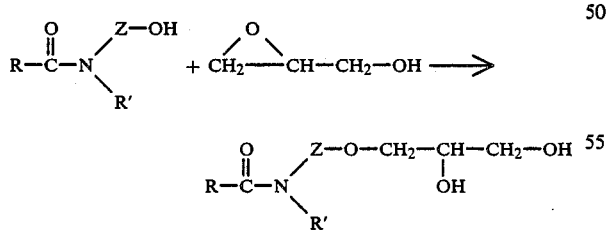

The reaction of the polycarboxylic acid alkanolamides or polyamidopolycarboxylic acid alkanolamides with lactones to form esters is carried out analogously to the processes described in U.S. Pat. No. 4,360,643. The reaction of the lactone takes place with the OH groups of the polycarboxylic acid alkanolamide or polyamidocarboxylic acid alkanolamide with ring opening and ester formation, for example at 100° C. to 180° C., either in suitable solvents such as high-boiling naphtha fractions, alkylbenzenes, esters or ketones, or directly in the melt, and it is catalyzed by, for example, p-toluenesulfonic acid or dibutyltin dilaurate.

By way of example, the reaction proceeds as follows:

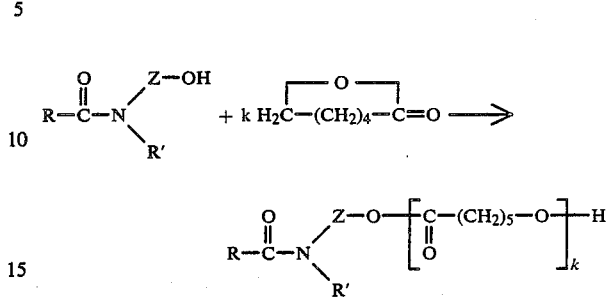

In some cases, particularly if solvents interfere, it is advisable to distil off these solvents together with the excess reaction components and to utilize the end products in this form. A preferred form of application is to dissolve these end products in a solvent suitable for the later end use; if the thixotropic formulation contains an unsaturated polyester resin, the resulting reaction product of the formula I will, for example, advantageously be dissolved in styrene, so that no interfering solvents are introduced into the system.

In a high-solids coating system, the compounds of the formula I will advantageously be applied, if possible, in a 100% form or dissolved in solvents suitable for the system, such as, for example, esters or ketone.

The compounds of the formula I can preferably be directly added to the system. The silica can then be added and homogenized by using appropriate dispersing apparatus. Conversely, and equally preferably, the compounds of the formula I can be added after the dispersing process, without noticeable differences in thixotropic behavior manifesting themselves. In some applications, it can be appropriate to correct and adjust the thixotropy obtained by later addition of the agents, so that both forms of application can also be used successively. In some cases, it is advisable to prepare the SiO₂ as a highly concentrated master paste with appropriate addition of the agents, using suitable dispersing machines, and subsequently to add the dispersion to the system which is to be rendered thixotropic.

The compounds of the formula I can also be applied directly to the highly disperse SiO₂ by means of suitable processes such as, for example, by dry mixing, by spraying, or by treatment in aqueous or organic solution and subsequent drying of the treated solids.

The invention therefore also relates to a highly disperse silica, which has been coated with compounds of the above formula I.

The quantity of the coating with the compounds of the formula I depends on the intended use of the thus coated highly disperse silica, and can be adjusted accordingly. Advantageously, the highly disperse SiO₂ is coated with at least 1% by weight, relative to the weight of the silica, of the compound of the formula I. Preferably, the lower limit is about 3% by weight and particularly preferably about 5% by weight. The upper limit of the quantity of coating naturally depends on the absorption capacity of the highly disperse silica for the compound of the formula I. The upper limit of the coating is appropriately about 100% by weight, relative to the weight of the silica, preferably about 40% by weight and particularly preferably about 20% by weight. Larger quantities are no advantage, also for economic reasons, since no significant improvement in the effect is achieved by a further increase in the quantity of additive.

Furthermore, the invention also relates to the use of compounds of the formula I for rendering liquid formulations thixotropic.

Examples of formulations according to the invention include: molding compounds, laminating resins, surface coatings (i.e. paints and lacquers), adhesives, sealing compounds, joint-sealing and filler compounds, plastisols, printing inks and mineral oils.

The term "molding compounds" is understood to refer to compounds which are processed to give molded bodies, whereby the reactive resins contained in the compounds as a rule are caused to react at an elevated temperature during molding. Examples of molding compounds within the meaning of the invention include those based on unsaturated polyester resins and vinyl ester resins, also in combination with thermoplastics such as polystyrene, polyvinyl acetate, polymethyl methacrylate and styrene/butadiene copolymers, which are added to the polyester resins as shrinkage-reducing constituents. Other molding compounds are in particular polyurethanes which are used, for example, in reaction-injection-molding.

Other molding compounds can also be based on epoxide resins. These epoxide resins are preferably used in the field of casting compounds and press-molding compounds. Further molding compounds, which can be processed, for example, by the liquid resin press-molding process, the injection process or the extrusion-drawing process, are the phenol/formaldehyde condensation resins which are also known under the term phenolic resins.

The molding compounds in general can also contain conventional additives or other constituents according to the state of the art. In particular, such molding compounds can contain fillers and/or reinforcing fillers such as, for example, glass fibers, carbon fibers and polyamide fibers, wollastonite, silicates, inorganic carbonates, aluminum hydroxide, barium sulfate and kaolin.

The term "coatings" includes, in accordance with the invention, both conventional coatings which, in most cases, are applied to a substrate from a liquid phase and form a covering film to produce a protective or functional and/or decorative surface, and coatings containing magnetic pigments, such as are used in the manufacture of data carriers, for example $Fe_2O_3$ and $CrO_2$. Substrates are to be understood as, for example, wood, metals, plastic films and sheets, plastic components, paper, leather and building materials such as, for example, masonry, concrete and plasters.

The coatings can be unpigmented, pigmented and dye-containing coatings which, in turn, can contain various types of binders such as, for example, unsaturated or saturated polyester resins, epoxide resins, polyurethane resins, acrylate and methacrylate resins, acrylate/aminoplast resins, acrylate/isocyanate resins, alkyd/aminoplast resins, alkyd resins and melamine resins and urea resins. As solvents, these coatings can contain organic solvents such as, for example, esters, ketones, aromatics, aliphatics and alcohols and/or water, as is known to persons skilled in the art.

Adhesives are very frequently rendered thixotropic by means of $SiO_2$ in order to reduce sagging on vertical surfaces, and in order to prevent dripping. Examples of suitable binders for such adhesives are epoxide resins, polychloroprene resins, (1- and 2-component) polyurethane resins and polyacrylate resins.

Acrylic resins, butyl rubber, polysulfide rubber, epoxide resins and polyurethanes are, for example, frequently used in the field of sealing compounds and joint-sealing compounds. In these systems again, highly disperse $SiO_2$ is used in order to reduce sag and to achieve thixotropy.

Plastisols consist essentially of pastable PVC powder and gelling plasticizers such as, for example, dioctyl phthalate, diisodecyl phthalate, dioctyl adipate, dioctyl sebacate, butyl benzyl phthalate and tricresyl phosphate. By means of $SiO_2$, thixotropy is established and the flow limit is increased, thus preventing running or penetration through a textile carrier fabric or other carrier material such as, for example, a glass fiber mat. Areas of use include, for example, underbody coatings for vehicles, sealing compounds, synthetic leather, tarpaulins, floor coverings and diving articles.

$SiO_2$ is also used in printing inks to increase the viscosity. This application is very similar to a conventional coating application as described above, in particular with respect to the pigmentation, solvents and binders. Here again, the solvents used may be, for example, alcohols, esters, ketones, glycol ethers, water and/or hydrocarbons. The binders are selected in accordance with the intended use of the printing ink, for example modified colophony resins, resinates and hydrocarbon resins for gravure printing inks, or polyvinyl resins, acrylic resins and polyamide resins for packaging printing inks.

It is very particularly preferred within the scope of the invention to use the agents according to the invention in resins like those described above under molding compounds, as well as in resins like those listed hereinafter under laminating resins and gel coats.

Laminating resins are essentially systems to which, in principle, the comments given above under molding compounds apply, but curing takes place as a rule at ambient temperature. Thus, these are cold-curing systems, in contrast to the molding compounds described above. Examples of laminating resins include those based on unsaturated polyester resins, vinyl ester resins and epoxide resins.

These laminating resins are as a rule reinforced by glass fibers and carbon fibers and can contain fillers such as, for example, $Al(OH)_3$, $CaCO_3$, $Sb_2O_3$ in addition to other auxiliaries necessary for processing, as is known to those skilled in the art. The comments given above with respect to laminating resins also apply in essence to gel coats; the essential differences being that in the normal case more stringent requirements are made on the resistance of the gel coat resins, especially with respect to their water resistance and weathering resistance. Moreover, these gel coat resins may contain coloring pigments, but usually no reinforcing materials. In general, these gel coat resins are rendered more highly thixotropic than laminating resins.

Thixotropy is of particular importance in these systems because, on the one hand, good penetration of the liquid resin into the layer structure of the reinforcing fibers is to be achieved and, on the other hand, after a certain relaxation time running off of the resin is to be prevented. In the gel coat structure, good flow is necessary in spite of high $SiO_2$ content. This is achieved by pronounced thixotropy such as is accomplished according to the invention to a particular degree.

Depending on the given system, the desired thixotropy effects can be adjusted according to the application via the added quantities of the compounds of the formula I, that is to say, as is known to those skilled in the art, varying rheological behavior is necessary for different application methods such as, for example, laminating, spraying or winding.

In order to achieve the desired thixotroping effect in the above mentioned systems, at least about 1% by weight, preferably at least about 3% by weight, and particularly preferably at least about 5% by weight, of the compounds of the formula I, relative to the weight of the silica, are employed. The upper limit is advantageously about 100% by weight, preferably about 40% by weight and particularly preferably about 20% by weight. Larger quantities are of no advantage, also for economic reasons, since no significant improvement in the effect is achieved by a further increase in the quantity of agent.

The preparation of the agents used according to the invention is explained in the following Preparation Examples 1 to 16.

Table 1 on page 25 contains the data which describe the reactions of Examples 6 to 12. In these examples, the synthesis was carried out analogously to Examples 1 to 3. The table indicates in each case which one of Examples 1 to 3 was followed in the subsequent example ("analogously to example").

The amine numbers (AmN, dimension mg KOH/g) are determined according to DIN 53 176. The acid numbers (AcN, dimension mg KOH/g) are determined according to DIN 53 402. The saponification number (SN, dimension mg KOH/g) is measured according to DIN 53 401. The water of reaction, obtained on continuous removal, is separated and weighed. The amide formation in % is calculated from the acid numbers and amine numbers before and after the reaction. The epoxide equivalent weight is determined according to DIN 53 188, and the solids content according to ASTM 1644 D. The hydroxyl number (OHN, dimension mg KOH/g) is measured according to DIN 53 240.

PREPARATION EXAMPLE 1

Preparation by amidation of a carboxylic acid 470 g of a technical azelaic acid having an acid number of 596 mg KOH/g and 525 g of diethanolamine having an amine number of 530 mg KOH/g in 300 g of xylene were reacted by a known method with azeotropic removal of the resulting water of reaction. For this purpose, the mixture was heated in a reaction vessel with stirrer and water separator until reflux was established at the water separator. The temperature required for this was approximately 145° C. The reaction was continued until no further water separated out. About 90 g of water were obtained (100% of theoretical yield based on the initial acid number). Since H₂O is also formed by a side reaction of the hydroxyfunctional amine, the water yields can also be greater than 100%. After stripping off the solvent, a viscous product having a residual acid number of 0.7 mg KOH/g and an amine number of 101 mg KOH/g was obtained. Consequently, 67% of the carboxyl groups were converted by amidation. The product is partially dissolved to 50% in cyclohexanone.

PREPARATION EXAMPLE 2

Preparation by amidation of a carboxylic acid ester 105 g of diethanolamine having an amine number of 530 mg KOH/g were heated to 80° C. in a reaction vessel with stirrer and water separator and, at this temperature, 97.1 g of dimethyl terephthalate having a saponification number of 577 mg KOH/g were added. The temperature was raised to 125° C. The methanol which was released was collected in the water separator. After 8 hours, no more methanol was obtained, and 21 g of methanol had been obtained. This corresponds to 66% of the theoretical yield based on the saponification number. The amine number at the end of the reaction was 138 mg KOH/g. This corresponds to 58% amidation. The resulting highly viscous product is partially dissolved to 50% in isobutanol.

PREPARATION EXAMPLE 3

Preparation by amidation of a dicarboxylic acid anhydride 50 g of succinic anhydride having an anhydride acid number of 557.5 mg KOH/g were dissolved in 122 g of xylene at 90° C. in a reaction vessel with stirrer, water separator and dropping funnel. 133 g of diisopropanolamine having an amine number of 421.2 mg KOH/g were added dropwise at this temperature within half an hour. The reaction mixture was then heated until reflux was established at the water separator. 11.5 g of water, corresponding to 128% of the theoretical yield, were collected. The xylene was distilled off from the resulting reaction mixture. The product had a residual acid number of 1 mg KOH/g and an amine number of 141 mg KOH/g. This corresponded to an amidation of about 55%. The reaction time was 7 hours. The product is partially dissolved to 50% in cyclohexanone.

PREPARATION EXAMPLE 4

Preparation of an acid component by reacting a dicarboxylic acid with a diamine 300 g of dimerized fatty acid having an acid number of 193 mg KOH/g and 32.6 g of hexamethylenediamine having an amine number of 890 mg KOH/g in 166 g of xylene were introduced into a reaction vessel with a stirrer and water separator with formation of an amide. The mixture was heated until reflux was established at the water separator. The water of reaction collected within 4 hours amounted to 9.2 g. This corresponds to 99% of the theoretical yield relative to the initial amine number. The product, which was subsequently reacted further, had an acid number of 60 mg KOH/g. The further processing is described in Example 11.

PREPARATION EXAMPLE 5 as described in Example 4, the following were reacted with one another:

150 g of dimerized fatty acid, acid number 193 mg KOH/g, and 9.6 g of diaminopropane, amine number 1,516 mg KOH/g, in 55 g of xylene. 4.8 g of water were given off within 4 hours. This amounts to 103% of the theoretical yield relative to the amine number. The acid number was 70 mg KOH/g. The further processing of the product is described in Example 12.

TABLE 1

| Preparation Example | Starting components | AcN/AmN/SN mgKOH/g | Batch size (g) | Analogous to Example | H₂O yield % of theory | Reaction time | AcN after reaction | AmN after reaction | % amide formation | Partial dissolution to 50% in |
|---|---|---|---|---|---|---|---|---|---|---|
| 6 | aliphatic dicarboxylic acid (C4–C6) | AcN 830 | 338 | B1 | | 5 hours | 25 | 133 | 63% | Cyclohexanone |
| | diethanolamine | AmN 530 | 525 | | 109% | | | | | |
| | xylene | | 300 | | | | | | | |
| 7 | aliphatic dicarboxylic acid (C4–C6) | AcN 830 | 250 | B1 | | 4 hours | 4 | 111 | 65% | Cyclohexanone |
| | diisopropanolamine | AmN 432 | 485 | | 101% | | | | | |
| | xylene | | 315 | | | | | | | |
| 8 | dimerized fatty acid | AcN 193 | 428 | B1 | | 4 hours | 1 | 44 | 67% | Cyclohexanone |
| | diethanolamine | AmN 530 | 155 | | 105% | | | | | |
| | xylene | | 170 | | | | | | | |
| 9 | trimerized fatty acid | AcN 193 | 146 | B1 | | 3 hours | 13 | 91 | 73% | Cyclohexanone |
| | diethanolamine | AmN 530 | 79 | | 111% | | | | | |
| | xylene | | 60 | | | | | | | |
| 10 | dimethyl adipate | SN 645 | 73 | B2 | Methanol 66% | 7.5 hours | — | 113 | 70% | Isobutanol |
| | diethanolamine | AmN 530 | 105 | | | | | | | |
| 11 | acid component from Example 4 (in xylene) | AcN 60 | 499 | B1 | | 4 hours | 5 | 36 | 76% | Cyclohexanone |
| | diethanolamine | AmN 530 | 52 | | 101% | | | | | |
| 12 | acid component from Example 5 (in xylene) | AcN 70 | 150 | B1 | 131% | 4 hours | 19 | 51 | 69% | Cyclohexanone |
| | diethanolamine | AmN 530 | 27.2 | | | | | | | |

PREPARATION EXAMPLE 13

Amidation of polyglycoldioic acid with diethanolamine 500 g of polyglycoldioic acid of the general formula $HOOC-CH_2-(O-CH_2-CH_2)_n-O-CH_2-COOH$ (n=10 to 12) having an acid number of 173.7 mg KOH/g were reacted in 284 g of xylene with 163 g of diethanolamine having an amine number of 530 mg KOH/g in a reaction vessel with a stirrer and water separator under amidation conditions. For this purpose, the reaction mixture was heated to 145° C., at which temperature reflux at the water separator began. The resulting water of reaction was removed as an azeotrope with xylene. The reaction was terminated after 4 hours. 27.3 g of water (98% of the theoretical yield relative to the initial acid number) were collected. The xylene was stripped in vacuo from the resulting two-phase mixture consisting of reaction product and xylene. A yellow, viscous and slightly turbid end product was obtained having an acid number of less than 1 mg KOH/g and an amine number of 17 mg KOH/g. Thus, 87% of the carboxyl groups were converted with formation of the amide. The product was partially dissolved to 50% in isobutanol.

PREPARATION EXAMPLE 14

Addition of ε-caprolactone to the OH groups of the compound of Example 8, with ring-opening esterification 224.8 g of the solvent-free reaction product from Preparation Example 8 were reacted with 276 g of ε-caprolactone having a saponification number of 152 mg KOH/g in the presence of 1 g of dibutyltin dilaurate as a catalyst in a reaction vessel with a stirrer and reflux condenser. For this purpose, the reaction mixture was stirred at a temperature of 160° C. The addition reaction of the ε-caprolactone was followed by determining the solids content. The reaction was terminated when the nonvolatile constituents amounted to 99.9% after 8 hours, that is to say when virtually no more free ε-caprolactone was present. The resulting end product, a brown, highly viscous liquid, had an amine number of 20.8 mg KOH/g and a hydroxyl number of 95 mg KOH/g. The product was partially dissolved to 50% in xylene.

PREPARATION EXAMPLE 15

Opening of an oxirane ring with ether formation, taking the example of the reaction of 2,3-epoxy-1-propanol with the OH groups of the compound from Example 8

The reaction mixture consisting of 376 g of the solvent-free compound from Preparation Example 8, 148 g of 2,3-epoxypropanol having an epoxide equivalent weight of 73, and 123.5 g of xylene was slowly heated under a nitrogen atmosphere and with stirring in an apparatus with a stirrer and reflux condenser. At 110° C., an exothermic reaction started, which raised the temperature to 148° C. The reaction was continued at a temperature of 150° C. and was followed by determining the increase in the epoxide equivalent weight. The reaction was terminated 5 hours after the onset of the exothermic reaction. At this point in time, the epoxide equivalent weight was 770,000. This corresponds to an epoxide conversion of more than 99%. A brown, highly viscous product was obtained which had a hydroxyl number of 288 mg KOH/g. The product is dilutable with xylene.

Application testing:

Test method

To determine the thixotropic behavior of liquids, a defined volume of the liquid in a stationary cylinder was moved by a cylindrical rotary body in an annular gap (rotary viscometer). The samples were measured at increasing shear rate (D ↑) within a defined period (t₁) up to a maximum shear rate (D max.) and for the same period (t₁=t₂) at decreasing shear rate (D ↓) down to a standstill. The shear stress ($\tau$) was determined as a function of the shear rate. The samples were temperature-controlled by means of a double-jacket vessel, and small deviations due to the occurrence of warming—caused by the rotary body—were disregarded.

The area between the ascending curve and the descending curve is the hysteresis area. This hysteresis area (L=$\tau$·D), related to the sheared volume, describes the power (units: Pa/s) consumed to reduce the thixotropic structure. As a further description of the thixotropic behavior, the work expended per unit volume is derived from the power by multiplication with the shear time.

$$\frac{W}{V} = L \cdot \text{shear time } (t_1 + t_2)$$

The products utilized in the examples of use are identified as follows:
A0 is a blank sample
A1 contains Preparation Example 8
A2 contains Preparation Example 12
A3 contains Preparation Example 9
A4 contains Preparation Example 10
A5 contains Preparation Example 1
A6 contains Preparation Example 6
A7 contains Preparation Example 7

As comparison examples according to the state of the art, the following products were used:
A8 contains polyoxyethylene sorbitan monolaurate
A9 contains glycerol
A10 contains polyethylene glycol ($M_n$=ca. 1000)
A11 contains citric acid solution (50%)+diethanolamine in a weight ratio of 2:1.5 (U.S. Pat. No. 4,238,387).

The measured values listed in Tables 2, 3 and 4 show a marked improvement in thixotropic behavior as well as settling behavior in the formulations treated with compounds of formula I, compared to the products employed according to the state of the at corresponding to A8, A9 and A10.

Preparation of the Samples

The batch size of each sample was 200 g. The products according to the foregoing preparation examples and the products according to the state of the art were stirred in a concentration of 20%—relative to the silica component—into the unsaturated polyester resin or dioctyl phthalate or mineral oil, before the addition of the silica component. In the preparation of the blank sample, the addition of compounds of formula I or products according to the state of the art, as indicated under A8 to A11, was omitted.

After addition of the silica, the samples were dispersed. The pyrogenic silica used was a silica having about 200 $m^2$ surface area/g (BET method—DIN 66131), because this silica substantially represents the state of the art relating to rendering liquid formulations thixotropic. Other silicas having different surface areas or produced by other processes were also tested and show similar behavior patterns. A laboratory dissolver was used for dispersing. The dispersing time was 5 minutes at 4,660 rpm.

EXAMPLES OF USE

Example 1

Substance:
Medium viscosity, highly-reactive isophthalic acid/-polyester resin according to DIN 16946, part 2, type 1140
3% of pyrogenic silica

EXAMPLE 2

Substance:
Low-viscosity, medium-reactive orthophthalic acid/-polyester resin according to DIN 16946, part 2, type 1110
2% of pyrogenic silica

EXAMPLE 3

Substance:
High-viscosity, medium-reactive vinyl ester resin according to DIN 16946, part 2, type 1140
3% of pyrogenic silica

EXAMPLE 4

Substance:
Medium-viscosity, unmodified epoxide resin based on bisphenol A
2% of pyrogenic silica

EXAMPLE 5

Substance:
Dioctyl phthalate
2% of pyrogenic silica

EXAMPLE 6

Substance:
Naphthene-based mineral oil (80 mPas at 20° C.)
1% of pyrogenic silica Measurement conditions Measuring apparatus:
Rotovisko RVIII, Haake
Temperature:
20° C.
Program:
0–90 rpm/90–0 rpm
Rate of Increase: 25 rpm
Measurement time ($t_1+t_2$): 7.2 min.

TABLE 2

| | Measured results 24 hours after preparation | | | | | | | | | |
|---|---|---|---|---|---|---|---|---|---|---|
| | Example | | | | | | | | | |
| | 1 | | 2 | | 3 | | 4 | | 5 | |
| Sample | L | W/V | L | W/V | L | W/V | L | W/V | L | W/V |
| A0 | 1021 | 7351.5 | 1207 | 8690.4 | 0 | 0 | 3714 | 26740.8 | 185 | 1332.0 |
| A1 | 3900 | 28080.0 | 2878 | 20721.6 | 3807 | 27410.4 | 7500 | 54000.0 | 1114 | 8020.8 |
| A2 | 2135 | 15372.0 | 2135 | 15372.0 | 2135 | 15372.0 | 7429 | 53488.8 | 1114 | 8020.8 |
| A3 | 1857 | 13370.4 | 1671 | 12031.2 | 1764 | 12700.8 | 6407 | 46130.4 | 1067 | 7682.4 |
| A4 | 1857 | 13370.4 | 1578 | 11361.6 | 2135 | 15372.0 | 7420 | 53424.0 | 538 | 3873.6 |

TABLE 2-continued

| | Measured results 24 hours after preparation | | | | | | | | | |
|---|---|---|---|---|---|---|---|---|---|---|
| | Example | | | | | | | | | |
| | 1 | | 2 | | 3 | | 4 | | 5 | |
| Sample | L | W/V | L | W/V | L | W/V | L | W/V | L | W/V |
| A5 | 2414 | 17380.8 | 1671 | 12031.2 | 2228 | 16041.6 | 7429 | 53488.8 | 528 | 3805.6 |
| A6 | 2135 | 15372.0 | 1578 | 11361.6 | 1764 | 12700.8 | 6407 | 46130.4 | 510 | 3672.0 |
| A7 | 1671 | 12031.2 | 1300 | 9360.0 | 1300 | 9360.0 | 5571 | 40111.2 | 1392 | 10022.4 |
| A8 | 278 | 2001.6 | 278 | 2001.6 | 928 | 6681.6 | 2785 | 20052.0 | 464 | 3340.8 |
| A9 | 278 | 2001.6 | 650 | 4680.0 | 464 | 3340.8 | 5571 | 40111.2 | 455 | 3276.0 |
| A10 | 185 | 1332.0 | 185 | 1332.0 | 1021 | 7351.2 | 4643 | 33429.6 | 473 | 3405.6 |
| A11 | — | — | — | — | <50 | <50 | — | — | — | — |

$L = \text{power}\left(Pa \cdot \frac{1}{s}\right)$ $W/V = \text{work/volume}\left(\frac{Nm}{m^3}\right)$

TABLE 3

| | Measured results 48 hours after preparation | | | | | |
|---|---|---|---|---|---|---|
| | Example | | | | | |
| | 1 | | 2 | | 3 | |
| Sample | L | W/V | L | W/V | L | W/V |
| A0 | 1300 | 9360.0 | 1207 | 8690.4 | 0 | 0 |
| A1 | 4086 | 29419.2 | 2878 | 20721.6 | 4178 | 30081.6 |
| A2 | 2321 | 16711.2 | 1950 | 14040.0 | 2228 | 16041.6 |
| A3 | 2135 | 15372.0 | 1578 | 11361.6 | 1857 | 13370.4 |
| A4 | 2045 | 14709.6 | 1392 | 10022.4 | 2321 | 16711.2 |
| A5 | 1671 | 12031.2 | 1485 | 10692.0 | 2693 | 19389.6 |
| A6 | 1950 | 14040.0 | 1392 | 10022.4 | 1857 | 13370.4 |
| A7 | 1671 | 12031.2 | 1578 | 11361.6 | 1300 | 9360.0 |
| A8 | 464 | 3340.2 | 185 | 1332.0 | 1021 | 7351.2 |
| A9 | 278 | 2001.6 | 464 | 3340.8 | 928 | 6681.6 |
| A10 | 371 | 2671.2 | 92 | 662.4 | 1021 | 7351.2 |

$L = \text{power}\left(Pa \cdot \frac{1}{s}\right)$ $W/V = \text{work/volume}\left(\frac{Nm}{m^3}\right)$

TABLE 4

| | Settling behavior of the pyrogenic silica in Example 6 | | | | | | | | | | |
|---|---|---|---|---|---|---|---|---|---|---|---|
| | 5 hours | | 24 hours | | 48 hours | | 96 hours | | 120 hours | | 144 hours | |
| | cm | % | cm | % | cm | % | cm | % | cm | % | cm | % |
| A0 | 4.2 | 42 | 6.1 | 61 | 6.5 | 65 | 6.5 | 65 | 6.7 | 67 | 7.1 | 71 |
| A1 | 0 | 0 | 0 | 0 | 0.2 | 2 | 0.5 | 5 | 0.8 | 8 | 1.0 | 10 |
| A2 | 0 | 0 | 0 | 0 | 0.2 | 2 | 0.5 | 5 | 0.9 | 9 | 1.0 | 11 |
| A3 | 0 | 0 | 0 | 0 | 0.2 | 2 | 0.5 | 5 | 0.9 | 9 | 1.4 | 14 |
| A4 | 0 | 0 | 0.3 | 3 | 0.5 | 2 | 0.8 | 8 | 1.1 | 11 | 1.6 | 16 |
| A8 | 0.2 | 2 | 0.6 | 6 | 1.2 | 12 | 2.4 | 24 | 3.4 | 34 | 4.0 | 40 |
| A9 | 3 | 3 | 4.0 | 40 | 4.5 | 45 | 4.8 | 48 | 5.0 | 50 | 5.1 | 51 |
| A10 | 0.2 | 2 | 0.5 | 5 | 0.9 | 9 | 2.0 | 20 | 3.0 | 30 | 3.3 | 33 |

The cm and % data relate to the clear supernatant liquid measured in the storage vessel.

The foregoing description has been set forth merely to illustrate the invention and is not intended to be limiting. Since modifications of the described embodiments incorporating the spirit and substance of the invention may occur to persons skilled in the art, the scope of the invention is to be limited solely with reference to the appended claims and equivalents.

We claim:

1. A thixotropic formulation comprising a liquid base, an effective thixotropy imparting amount of highly disperse silica, and an effective silica activity enhancing amount of a hydroxyfunctional polycarboxylic acid amide of formula I Ser. No. 162,901

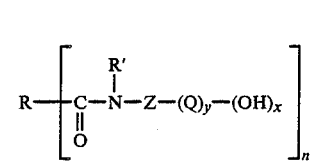

wherein the symbols have the following meanings:
R = aliphatic hydrocarbon groups having 2 to 60 carbon atoms or aromatic hydrocarbon groups having 6 to 20 carbon atoms or aliphatic or aliphatic/aromatic hydrocarbon radicals having 6 to 150 carbon atoms which are interrupted by 2, 4, 6 or 8 carboxamide groups, or aliphatic hydrocarbon radicals having 4 to 150 carbon atoms, which are interrupted by 2 to 75 —O— (oxygen) groups;
R' = H or $C_1$ to $C_4$ alkyl or —Z'—(Q)$_y$—(OH)$_x$;
x = 1 to 3;
y = 0 or 1;
Z = an alkylene radical having 2 to 6 carbon atoms;
Z' = an alkylene radical which is identical to or different from Z, having 2 to 6 carbon atoms;
Q = an aliphatic hydrocarbon radical having 2 to 200 carbon atoms, which is linked via —O— or

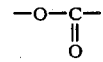

to Z or Z' and is interrupted by zero to 99 oxygen atoms and/or carboxylic acid ester groups, and
n = 2 to 3.

2. A formulation according to claim 1, wherein Q is an aliphatic hydrocarbon group having 2 to 80 carbon atoms, which is linked via —O— or

to Z or Z' and is interrupted by zero to 39 groups individually selected from the group consisting of oxygen atoms and carboxylic acid ester groups.

3. A formulation according to claim 1, wherein R is an aliphatic hydrocarbon group having 6 to 44 carbon atoms.

4. A formulation according to claim 1, wherein R is an aliphatic hydrocarbon group having 34 to 42 carbon atoms.

5. A formulation according to claim 1, wherein R is the hydrocarbon group of a dimer fatty acid.

6. A formulation according to claim 2, wherein R is the hydrocarbon group of a dimer fatty acid.

7. A formulation according to claim 1, wherein R is an aliphatic hydrocarbon group having 6 to 26 carbon atoms which is interrupted by 3 to 13 oxygen atoms.

8. A formulation according to claim 1, wherein R is an aliphatic hydrocarbon group having 70 to 90 carbon atoms which is interrupted by 2 carboxamide groups.

9. A formulation according to claim 1, wherein R' is $-Z-(Q)_y-(OH)_x$ and x and y are as defined above.

10. A formulation according to claim 1, which contains hydroxyfunctional polycarboxylic acid amides in amounts of at least 1% by weight, relative to the silica.

11. A formulation according to claim 2, which contains hydroxyfunctional polycarboxylic acid amides in amounts of at least 1% by weight, relative to the silica.

12. A formulation according to claim 10, which contains polyhydroxyfunctional carboxamides in amounts of at least 3% by weight, relative to silica.

13. A formulation according to claim 12, which contains polyhydroxyfunctional carboxamides in amounts of at least 5% by weight, relative to silica.

14. A highly disperse silica which is coated with a hydroxyfunctional carboxylic acid amide of formula I:

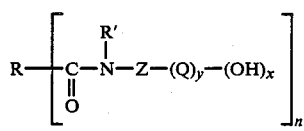

(I)

wherein the symbols have the following meanings:
R = aliphatic hydrocarbon groups having 2 to 60 carbon atoms or aromatic hydrocarbon groups having 6 to 20 carbon atoms or aliphatic or aliphatic/aromatic hydrocarbon groups having 6 to 150 carbon atoms, which are interrupted by 2, 4, 6 or 8 carboxamide groups, or aliphatic hydrocarbon groups having 4 to 150 carbon atoms, which are interrupted by 2 to 75 —O— (oxygen) groups;
R' = H or $C_1$ to $C_4$ alkyl or $-Z'-(Q)_y-(OH)_x$;
x = 1 to 3;
y = 0 or 1;
Z = an alkylene group having 2 to 6 carbon atoms;
Z' = an alkylene group which is identical to or different from Z, having 2 to 6 carbon atoms;
Q = an aliphatic hydrocarbon group having 2 to 200 carbon atoms, which is linked via —O— or

to Z or Z' and is interrupted by zero to 99 groups individually selected from the group consisting of oxygen atoms and carboxylic acid ester groups, and
n = 2 to 3.

15. A highly disperse silica according to claim 14, wherein Q is an aliphatic hydrocarbon-having 2 to 80 carbon atoms, which is linked via —O— or

to Z or Z' and is interrupted by zero to 39 groups individually selected from the group consisting of oxygen atoms and carboxylic acid ester groups.

16. A highly disperse silica according to claim 14, wherein R is an aliphatic hydrocarbon group having 6 to 44 carbon atoms.

17. A highly disperse silica according to claim 14, wherein R is an aliphatic hydrocarbon group having 34 to 42 carbon atoms.

18. A highly disperse silica according to claim 14, wherein R is the hydrocarbon group of a dimer fatty acid.

19. A highly disperse silica according to claim 15, wherein R is the hydrocarbon group of a dimer fatty acid.

20. A highly disperse silica according to claim 14, wherein R is an aliphatic hydrocarbon group having 6 to 26 carbon atoms which is interrupted by 3 to 13 oxygen atoms.

21. A highly disperse silica according to claim 14, wherein R is an aliphatic hydrocarbon group having 70 to 90 carbon atoms which is interrupted by 2 carboxamide groups.

22. A highly disperse silica according to claim 14, wherein R' is $-Z-(Q)_y-(OH)_x$ and x and y are as defined above.

23. A highly disperse silica according to claim 15, which is coated with at least 1% by weight of a compound of formula I.

24. A highly disperse silica according to claim 15, which is coated with at least 1% by weight of a compound of formula I.

25. A highly disperse silica according to claim 24, which is coated with at least 3% by weight of a compound of formula I.

26. A highly disperse silica according to claim 25, which is coated with at least 5% by weight of a compound of formula I.

27. A method of rendering a liquid formulation thixotropic comprising the step of incorporating into said formulation an effective thixotropy imparting amount of highly disperse silica and an effective silica activity enhancing amount of a hydroxyfunctional polycarboxylic acid amide of formula I

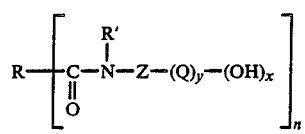

(I)

wherein the symbols have the following meanings:

R = aliphatic hydrocarbon groups having 2 to 60 carbon atoms or aromatic hydrocarbon groups having 6 to 20 carbon atoms or aliphatic or aliphatic/aromatic hydrocarbon groups having 6 to 150 carbon atoms which are interrupted by 2, 4, 6 or 8 carboxamide groups, or aliphatic hydrocarbon groups having 4 to 150 carbon atoms, which are interrupted by 2 to 75 —O— (oxygen) groups;

R' = H or $C_1$ to $C_4$ alkyl or —Z'—(Q)$_y$—(OH)$_x$;

x = 1 to 3;

y = 0 or 1;

Z = an alkylene group having 2 to 6 carbon atoms;

Z' = an alkylene group which is identical to or different from Z, having 2 to 6 carbon atoms;

Q = an aliphatic hydrocarbon group having 2 to 200 carbon atoms, which is linked via —O— or

to Z or Z' and is interrupted by zero to 99 groups individually selected from the group consisting of oxygen atoms and carboxylic acid ester groups, and n = 2 to 3.

28. A method according to claim 27, wherein Q is an aliphatic hydrocarbon group having 2 to 80 carbon atoms, which is linked via —O— or

to Z or Z' and is interrupted by zero to 39 groups individually selected from the group consisting of oxygen atoms and carboxylic acid ester groups.

29. A method according to claim 27, wherein R is the hydrocarbon group of a dimer fatty acid.

30. A method according to claim 27, wherein said hydroxyfunctional polycarboxylic acid amide is present in an amount of at least 1% by weight, relative to the silica.

31. A method according to claim 27, wherein said silica and said hydroxyfunctional polycarboxylic acid amide are separately incorporated into said formulation.

32. A method according to claim 27, wherein said silica is coated with said hydroxyfunctional carboxylic acid amide prior to incorporation into said formulation.

* * * * *